United States Patent

[11] 3,619,654

[72] Inventor Edward W. Nichols
Monroeville, Pa.
[21] Appl. No. 848,658
[22] Filed Aug. 8, 1969
[45] Patented Nov. 9, 1971
[73] Assignee Westinghouse Electric Corporation
Pittsburgh, Pa.

[54] CONTROLLED AC PULSE CIRCUIT
7 Claims, 1 Drawing Fig.

[52] U.S. Cl. .......... 307/252 UA, 307/284, 307/305
[51] Int. Cl. .......... H03k 17/72
[50] Field of Search .......... 307/252.10, 252.22, 252.54, 252.55, 252.70, 252.74, 305, 284

[56] References Cited

UNITED STATES PATENTS

| | | | |
|---|---|---|---|
| 3,225,214 | 12/1965 | Burley | 307/252 X |
| 3,249,929 | 5/1966 | Sillers | 307/252 X |
| 3,428,863 | 2/1969 | Wright | 307/252 X |
| 3,466,466 | 9/1969 | Neumann | 307/305 X |

OTHER REFERENCES

G. E. SCR Manual " One Shot SCR Trigger Circuit," p. 151- 152 & FIG. 8.11, 4th adition, 1967

*Primary Examiner*—Donald D. Forrer
*Assistant Examiner*—L. N. Anagnos
*Attorneys*—F. H. Henson, C. F. Renz and M. P. Lynch

ABSTRACT: The invention is an AC switching circuit comprising a potential source, a controlled conduction means having a control electrode and a control bias circuit for gating the controlled conduction means to a conductive state during a single half cycle of the AC potential.

10

PATENTED NOV 9 1971
3,619,654
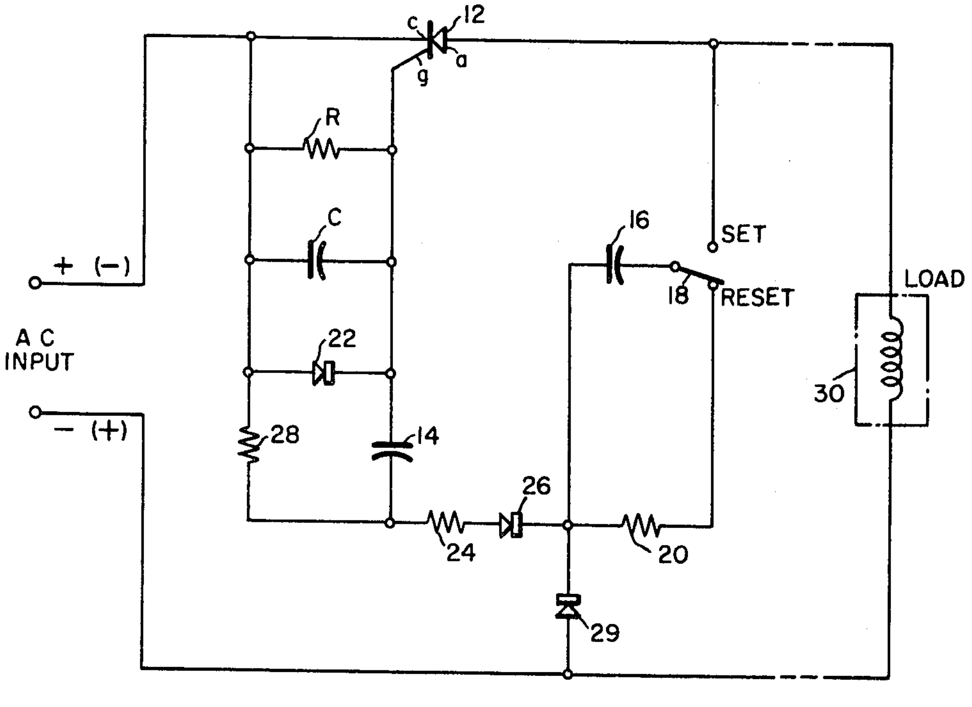
10
WITNESSES
Wm. B. Sellers.
James F. Young
INVENTOR
Edward W. Nichols
BY Michael P. Lynch
ATTORNEY

CONTROLLED AC PULSE CIRCUIT

BACKGROUND OF THE INVENTION

1. Field of the Invention

The invention relates to a controlled switching circuit operative during selected half cycles of an AC potential.

2. Description of the Prior Art

One-shot pulse producing circuits are utilized in various applications including the electrically operated tools of the single power stroke type.

The controlled AC electric pulse circuits currently available generally employ either a large capacitor discharge circuit or a gated solid state switching circuit which is placed in a conductive state in response to selected half cycles of an AC potential.

A solid state switching circuit provides a more compact circuit package than that of the capacitor circuit and therefore is preferred in most applications.

The basic requirements of the solid state circuits, which commonly utilize a gated silicon controlled rectifier (SCR) as a controlled unidirectional conduction means, are:

a. circuit means to control the gating of the SCR relative to the phase of the AC potential and independent of the time in the cycle at which the circuit is activated, and b. circuit means to limit the operation of the switching circuit to a single electrical pulse output for each gating, or activation of the SCR.

A solid state pulse circuit presently in use employs an SCR circuit and a separate trigger circuit which produces a series of trigger pulses which are synchronized with the AC potential, typically 60 Hz. Upon activation of a control switch the two circuits are connected to a diode and a blocking capacitor. The charge time of the capacitor is so chosen that conduction through the diode is inhibited after passage of the first trigger pulse.

Another solid state pulse circuit currently in use employs a saturable reactor transformer to gate an SCR. Activation of a control switch causes the core of the transformer to be set in one polarity and as the voltage of the source subsequently changes polarity, the core is reset. As the transformer is reset, the SCR is gated ON.

While numerous other methods for implementing a pulse circuit are available, all the circuits presently available require numerous expensive components, such as transistors, SCR's, saturable reactor transformers, etc. which generally result in expensive, complicated pulse circuits.

SUMMARY OF THE INVENTION

The invention is a novel solid state pulse circuit which utilizes a single controlled unidirectional conduction means to accomplish the desired circuit operations noted above (a, b). This novel circuit provides a simple and inexpensive method of selecting a single half cycle of an AC potential to gate the controlled conduction means.

The operation of the novel circuit includes the charging of the two series connected capacitors during a half cycle of the AC potential preceding the desired conduction half cycle of the controlled conduction means (typically an SCR) and permitting the charge of the first capacitor to gate the SCR to an ON condition. Conduction through the SCR causes the second capacitor to approximately peak AC source potential, thereby preventing further charging of the first capacitor and consequently limiting the conduction of the SCR to a single half cycle. A reset circuit is provided to dissipate the peak charge on the second capacitor thereby permitting a subsequent single activation of the SCR pulse circuit.

DESCRIPTION OF THE DRAWING

The drawing is a schematic diagram of a preferred embodiment of the invention.

DESCRIPTION OF THE PREFERRED EMBODIMENT

Referring to the drawing there is illustrated schematically an AC pulse circuit 10 comprising a controlled unidirectional conduction means 12 connected in series between an AC potential source (not shown) and a load circuit 30, and series connected capacitors 14 and 16. The controlled unidirectional conduction means 12 can be any one of several devices well known in the art which conduct electrically in a single direction in response to a gate ON or activation signal. The controlled, conduction device depicted in the drawing is a silicon controlled rectifier which will be hereinafter referred to as an SCR. The load circuit 30 is depicted as an inductive coil representing a solenoid operated device, such as an electric stapler.

A switching element 18, schematically illustrated as a single pole, double throw switch operates to connect the series connected capacitors 14 and 16 to the AC potential. The switch positions are identified as set and reset. It is apparent that any one of numerous mechanical, electromechanical, and solid state devices can be used to implement this switching operation.

In the operation of the pulse circuit 10 in an electric stapler, the switch 18 would preferably be a mechanical switch capable of random operation either by operator manual control or in response to the insertion of a workpiece. In the latter instance, the switch could be spring loaded in the reset position thereby requiring the switch action to set and reset the circuit 10 for each SCR conduction pulse.

The cathode terminal *c* of the SCR 12 is connected to the AC potential and the anode electrode *a* is connected to the load circuit 30. The control, or gate electrode *g* of the SCR is connected to the capacitor 14.

In general the capacitor 14 responds to the activation of the switch 18 to the set position by developing a control electrode gating potential during the half cycle of the AC potential in which the SCR is reverse biased, and subsequently applying the gating potential to the control electrode *g* to permit conduction through SCR 12 during the subsequent forward bias half cycle of the AC potential. The series connected capacitor 16 develops a charge during both the SCR reverse and forward bias AC half cycles. The capacitor 16 charges to a potential approximating the peak AC potential and with the switch 18 in the set position functions to block subsequent charging of the capacitor 14. The inhibiting action of the charged capacitor 16 prevents the development of the control electrode bias potential and thus limits the conduction of the SCR 12 to a maximum of one half cycle of the AC potential.

Subsequent resetting of the switch 18 provides a dissipation path of the charge on capacitor 16 through resistor 20 and thereby restores the circuit 10 to the condition which will permit the conduction of a single electrical pulse of half cycle duration in response to the activation of the switch 18 to the set position.

Initially, in normal circuit operation, there is no charge present on capacitors 14 and 16. Therefore no gating potential is present at the control electrode *g* which would enable the SCR to conduct during the forward bias half cycle of the AC potential. Upon actuation of the switch 18 to the set position and the first occurrence of an SCR reverse bias AC potential thereafter, current flows momentarily through a rectifier element 22, capacitor 14, a resistance element 24, rectifier element 26 and capacitor 16 until the capacitors 14 and 16 become charged to a value proportional to the half cycle AC potential at which time the current flow ceases. The charge on the capacitor 14 then dissipates through the cathode-gate circuit of the SCR 12 and the resistance element 28 thereby developing a positive control electrode *g* bias voltage with respect to the cathode electrode *c*. The control electrode bias voltage thus developed places the SCR in a conductive state during the subsequent SCR forward bias half cycle of the AC potential. The AC potential polarity corresponding to the forward bias half cycle of the AC potential is illustrated in parenthesis, while the SCR reverse bias potential polarity is indicated without parenthesis.

While the discharge of capacitor 14 commences during the reverse bias AC half cycle, the successful gating of the SCR is achieved by insuring capacitor discharge into the succeeding forward bias AC half cycle.

In the embodiment illustrated in the drawing this is accomplished by selecting a capacitor 14 value and a resistor 28 value sufficient to develop a circuit time constant which will insure incomplete capacitor discharge prior to the occurrence of the succeeding forward bias AC half cycle.

During the SCR conduction half cycle, the capacitor 16 is further charged by current flow through the rectifier element 29 and ultimately obtains a charge potential proportional to the peak AC potential. As a result of the charge build up on capacitor 16 during both the SCR reverse and forward bias AC half cycles, the capacitor 16 inhibits current flow through capacitor 14 and consequently inhibits the gating of the SCR 12 during subsequent reverse bias AC half cycles.

The actuation of the switch 18 to the reset position provides a dissipation path through the resistance element 20 for the peak charge on capacitor 16. The dissipation of the charge on the capacitor 16 restores the circuits to its original condition in which a subsequent set actuation of the switch 18 will result in the conduction of a half cycle AC current pulse through SCR 12 to the load 30. The magnitude of the current flow through the load 30 is primarily determined by the load impedance.

While the switch 18 provides for random actuation, the gating of the SCR corresponds to the zero crossover of the AC potential source.

Assume for example the switch 18 is set during a reverse bias AC half cycle but too late to derive the full voltage and current. In such case the gating ON of the SCR 12 is delayed until the proper instant of the succeeding cycle of the AC potential.

The resistor R and capacitor C connected in parallel between the cathode electrode *c* and the gate electrode *g* of the SCR 12 are not required for the circuit operations as described. The resistor R is utilized to compensate for a variance in sensitivity between SCR's and therefore may not always be required. The capacitor C is useful to prevent erroneous gating of the SCR 12 in the event of transients on the AC power lines.

Various modifications may be made within the scope of this invention.

I claim:

1. An AC switching circuit comprising, an AC potential source, a load circuit, a controlled conduction means having a control electrode, said controlled conduction means connected in series between said AC potential source and said load circuit, said AC potential source providing alternate reverse and forward bias potential half cycles, a switching circuit means having a set and reset condition, a first circuit means operatively connected to said switching circuit means and responding to a set condition thereof to develop a control electrode gate potential during a reverse bias half cycle of said AC potential and apply said gate potential to said control electrode during a forward bias half cycle of said AC potential to place said controlled conduction means in a conductive state during said forward bias half cycle, and a second circuit means operatively connected to said switching circuit means to develop a voltage during the reverse and forward bias half cycles of said AC potential, said voltage inhibiting conduction of said controlled conduction means during subsequent forward bias half cycles of said AC potential until said switching circuit means is subsequently reset and set.

2. An AC switching circuit as claimed in claim 1 wherein said first circuit means includes a capacitor, said capacitor acquiring a charge during the reverse bias half cycle of said AC potential, said capacitor discharge during the succeeding forward bias half cycle of said AC potential providing the gate bias potential to said control electrode of said controlled conduction means.

3. An AC switching circuit as claimed in claim 2 wherein said second circuit means includes a capacitor connected in series with the capacitor of said first circuit means, said second circuit means capacitor acquiring a charge during both the reverse bias half cycle and the forward bias half cycle of said AC potential to develop a total storage charge approximately proportional to the peak AC potential, said storage charge preventing charging of said first circuit means capacitor during subsequent reverse bias half cycle of said AC potential.

4. An AC switching circuit as claimed in claim 3 wherein said switching circuit means reset condition provides a dissipation path for the storage charge on said second circuit means capacitor to permit charging of said first circuit means capacitor and subsequent single half cycle conduction of said control conduction means in response to a subsequent set condition of set switching means.

5. An AC switching circuit as claimed in claim 2 wherein said first circuit means includes an electrical resistor element operatively associated with said capacitor to form a resistor-capacitor combination exhibiting a time constant sufficient to insure discharging of the capacitor during the succeeding AC forward bias half cycle.

6. A circuit for supplying a single energizing signal to a load from an alternating current potential source, comprising, a gated rectifier element having a cathode, an anode, and a gate electrode, circuit means connecting the AC potential source in series with the load and the cathode-anode circuit of the gated rectifier, a first capacitor developing a potential charge during half cycles of a first polarity of said AC potential and applying a gating potential to said gate electrode during a half cycle of a second polarity of said AC potential to place said gated rectifier element in a conductive state, a second capacitor connected in series with said first capacitor and developing a potential charge during said first and second polarity half cycles to inhibit the charging of said first capacitor and conduction of said controlled conduction means during subsequent second polarity half cycles of said AC potential, and circuit reset means operatively connected to said second capacitor to provide dissipation of the charge on said second capacitor.

7. An AC switching circuit comprising, an AC potential source, a load circuit, a controlled conduction means having an anode electrode, a cathode electrode, and a gate electrode, said cathode electrode being connected to said AC potential source and said anode electrode being connected to said load, said AC potential source providing alternate reverse and forward bias potential half cycles, a switching circuit means having a set and reset condition, a first circuit means including a first capacitor being operatively connected to said switching circuit means and responding to a set condition thereof to develop a control electrode gating potential across said first capacitor during a reverse bias half cycle of said AC potential for applying said gating potential to said control electrode during a forward bias half cycle of said AC potential to place said controlled conduction means in a conductive state during said forward bias half cycle, and a second circuit means including a second capacitor being operatively connected to said switching circuit means to connect said second capacitor in series with said first capacitor when said switching circuit means is in a set condition and developing a potential across said second capacitor during said reverse and forward bias half cycles of said AC potential, said potential developed across said second capacitor inhibiting charging of said first capacitor and gating of said controlled conduction means during subsequent forward bias half cycles of said AC potential until said switching circuit means is subsequently reset and set.

* * * * *